United States Patent [19]

Bächtiger

[11] Patent Number: 5,001,486
[45] Date of Patent: Mar. 19, 1991

[54] RADAR SYSTEM FOR DETERMINING THE POSITION OF TWO OR MORE OBJECTS

[75] Inventor: Rolf Bächtiger, Oberwil-Lieli, Switzerland

[73] Assignee: Siemens-Albis, Zurich, Switzerland

[21] Appl. No.: 389,450

[22] Filed: Aug. 4, 1989

[51] Int. Cl.$^5$ .................. G01S 13/74; G01S 13/80
[52] U.S. Cl. .................... 342/42; 342/50; 342/60; 342/43; 342/73; 342/146; 342/62
[58] Field of Search .............. 342/42, 43, 50, 58, 342/59, 60, 73, 74, 146, 62; 244/3.11, 3.13, 3.15, 3.19

[56] References Cited

U.S. PATENT DOCUMENTS

| | | | |
|---|---|---|---|
| 3,001,186 | 9/1961 | Baltzer | 342/58 |
| 3,151,323 | 9/1964 | Baldridge | 342/43 |
| 3,176,288 | 3/1965 | Wyatt | 342/58 |
| 3,182,930 | 5/1965 | Randolph, Jr. et al. | 342/43 X |
| 3,226,713 | 12/1965 | Sorkin et al. | 342/58 |
| 3,289,204 | 11/1966 | Murray et al. | 342/58 |
| 3,455,522 | 7/1969 | Galipon | 244/3.14 |
| 3,469,260 | 9/1969 | Holt | 342/50 |
| 3,560,971 | 2/1971 | Alsberg et al. | 342/42 |
| 3,560,974 | 2/1971 | Lecourtier et al. | 342/91 |
| 3,729,150 | 4/1973 | Conger | 342/50 X |
| 3,742,495 | 6/1973 | Diamantides | 342/64 |
| 3,772,668 | 11/1973 | Smith | 342/42 X |
| 3,891,985 | 6/1975 | Oigarden et al. | 342/50 X |
| 4,249,176 | 2/1981 | Oishi et al. | 342/42 |
| 4,442,431 | 4/1984 | Bleakney | 342/62 |
| 4,908,627 | 3/1990 | Santos | 342/125 |

FOREIGN PATENT DOCUMENTS 1179691 1/1970 United Kingdom .

OTHER PUBLICATIONS

European Patent Office Search Report in corresponding application CH 02 964/88, dated May 2, 1989.
The record of the IEEE 1980 International Radar Conference, Apr. 28–30, 1980, Arlington, Va., pp. 1–7, IEEE, New York, U.S.; L. E. Kitchens: "The HR-76 Fire Control Radar".
Conference Proceedings, Military Microwave '86, 24–26, Jun. 1986, Brighton, pp. 69–74, Microwave Exhibitions and Publishers Ltd., Tunbridge Wells, Kent, GB; R. L. Stegall: "Multiple Object Tracking Radar".

Primary Examiner—Thomas H. Tarcza
Assistant Examiner—John B. Sotomayor
Attorney, Agent, or Firm—Adel A. Ahmed

[57] ABSTRACT

A radar system operating by the line-of-sight method requires an accurate measurement of the relative position of at least two objects. By sending out coded radar transmission pulses, control data are transmitted to a guided flying body in a radar beam, which sends back an echo signal to the receiver via a transponder. In order to measure the passive signal and the transponder echo signal in the radar beam as accurately as possible, common reception channels are provided for both echo signals containing, inter alia, arrangements to equalize the dynamic levels of the echo signals. The returned transponder echo signal corresponds with respect to coding and bandwidth to the transmission pulses originally generated in the transmitter and that are phase-coded but not provided with the control code.

20 Claims, 2 Drawing Sheets

RADAR SYSTEM FOR DETERMINING THE POSITION OF TWO OR MORE OBJECTS

FIELD OF THE INVENTION

The present invention relates to a radar system for determining the position of at least two objects, including a transmitter and a receiver, wherein the transmitter sends control data to a first steerable object by means of coded transmission pulses, and wherein the object, via a transponder, sends echo signals back to the receiver which has a microwave network on its input side, from which a plurality, preferably four, parallel reception processing channels lead to a mixing and preamplifying arrangement.

DESCRIPTION OF RELATED ART

Radar systems for the automatic tracking of a target require the measurement of the spatial orientation of the target in terms of all three coordinates. The accuracy of the absolute angle measurement of a target is thereby limited by reason of asymmetries in the signal processing channels and a limited accuracy of the antenna geometry. These variables, that is, for example, effects depending on ambient temperature, lead to deviations of the measuring axis from the actual antenna-target connecting axis that cannot be eliminated with a single one-time correction. On the other hand, if two or more objects are to be measured, it is sufficient most of the time to determine their position relative to one another. Thus, in the so-called line-of-sight method, the data of, for instance, two objects are acquired by one reception system, processed and correlated. The errors occurring when determining the absolute spatial orientation of a target do not become noticeable as long as it is a question of merely determining the relative position of the objects relative to one another. The line-of-sight method finds frequent application in air defense or in rendezvous maneuvers during space flight, where two or more targets must be brought into line of sight. In doing this, the computed position error is continuously transmitted to at least one guided or steerable object on which flight path corrections are then made by an automatic control system. To increase protection against interference during measurement of the object, it is customary to equip at least one of the objects with a transponder for amplifying the echo signal. In this case, the transponder echo can differ in all essential parameters, such as frequency, modulation, spectral characteristics, from the echo signal of a passive object. Thus it is a known practice, for instance, to send the echo signal of the transponder in the form of a continuous-wave signal, which requires the use of extremely narrowband selective filters on the reception side, in order to give the system the desired immunity to interference. But a narrowband receiver is as a rule not adequately suited to process also passive object echo signals in a satisfactory manner. Because of the different dynamic ranges of passive and transponder echo signals, prior art systems of this type have had at least partially separate arrangements in the reception channel of the tracking radar for the processing of the echo signals. But separate receiving channels generally result in deviating measuring axes and thus usually cause substantional measuring errors. An advantage of the line-of-sight method is thereby lost, which is that because of identical echo signal processing in the receiver, no differential errors are introduced. Prior art systems can only do limited justice to the requirements of the line-of-sight system, as they arise with the use of transponders.

SUMMARY OF THE INVENTION

It is an object of the present invention to provide a radar system wherein the relative spatial orientation between two or more objects of which at least one has a transponder for echo signal amplification can be determined with certainty and accuracy.

The problem is solved in accordance with the invention, in that the same reception processing channels are provided in the receiver for both passive and transponder echo signals, and in that the transponder is so designed that the echo signals returned by the transponder correspond, with respect to their coding and bandwidth, to the transmission pulses originally generated in the transmitter and which are phase-coded but not provided with the control code. This double use of the radar receiver results not only in an improved accuracy with the line-of-sight method, but also in a substantial saving and simplification of the receiver in the radar installation. The transmission pulses used can have a characteristic phase coding that, on the reception side, can serve for correlation in a so-called pulse compression filter. Since the transponder returns pulses with the same phase coding, the same reception correlation results in the receiver.

In accordance with another aspect, the invention relates to a transponder for use in a radar system, including a decoder that is coupled, on the input side, with a series arrangement comprising an antenna, a limiter, circulator and microwave network, and which derives control signals for the object from the received coded radar transmission pulses, and establishes a trigger signal for a signal generator, and wherein a delay arrangement for the trigger signal is provided which may be switched in via the decoder, so that a delayed triggering of the signal in the signal generator is made possible. The signal generator is coupled to the circulator via a frequency converter coupled to an oscillator and a power amplifier coupled downstream.

Since all reception signals are processed by the same receiver, care must be taken that echoes received from different objects are separated in time. If, for instance, only passive echo signals are received from two or more objects, they can only be processed separately as long as the distance resolving capacity of the radar systems is not exceeded. The transponder in accordance with the invention, for this reason, is advantageously provided with a delay arrangement that may be switched in, and by means of which the echo signals can be emitted, with a constant time delay. The echo signals that are initially emitted directly upon reception of the radar signal, with only minimum delay, are emitted with delay when the distance to another object becomes less than a given value. This ensures that the different echo signals in the radar receiver do not overlap when the objects approach one another beyond the distance resolving capacity of the radar system.

An exemplary embodiment of the invention is described in greater detail below, with reference to drawings, in which

DESCRIPTION OF PREFERRED EMBODIMENTS

Figure 1:
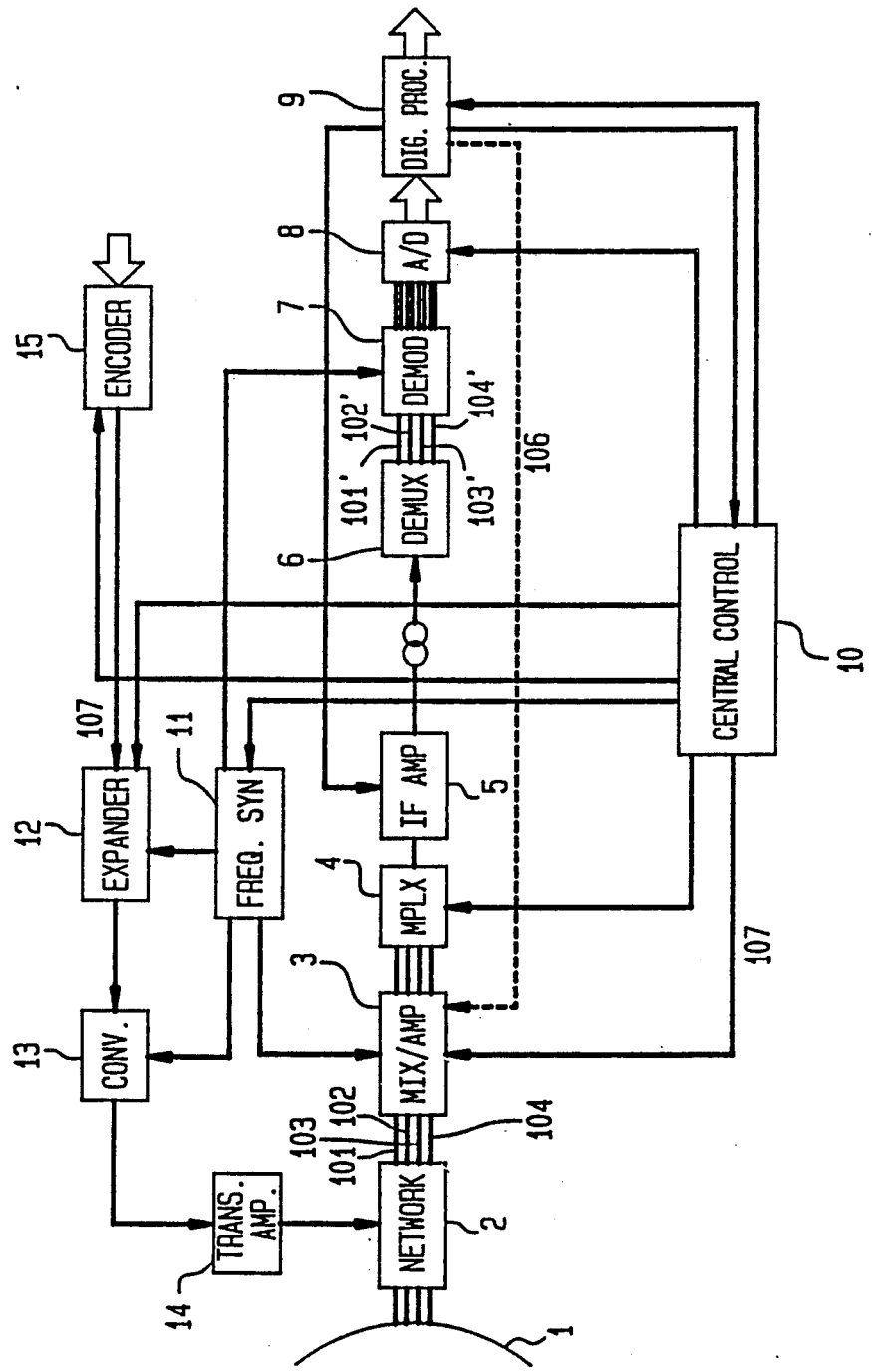
FIG. 1 shows a block diagram of a tracking radar installation for a radar system according to the invention.

The tracking radar installation according to FIG. 1 has a series arrangement coupled by four parallel reception processing channels 101, 102, 103 and 104, comprising a microwave network 2, a mixing and preamplifying arrangement 3, and an intermediate frequency multiplexer 4. Intermediate frequency multiplexer 4 is coupled to an intermediate frequency amplifier 5 on the output side, to which a demultiplexer 6 is coupled downstream. Demultiplexer 6 is coupled to a quadrature demodulator 7 on the output side via the parallel reception processing channels 101', 102', 103' and 104', to which an analog/digital converter 8 and a digital signal processor 9 are coupled downstream. Control pulses derived from digital signal processor 9 are applied to intermediate frequency amplifier 5 and when necessary to the mixing and preamplifying arrangement 3, via lines 105 or 106. The control pulses and their effect will be explained later on. On the transmit side, a series arrangement comprising a pulse expander 12, an up-converter 13, and a transmission amplifier 14 is coupled to microwave network 2, which is coupled with the common transmission and reception antenna 1.

A frequency synthesizer 11 is coupled on the output side with pulse expander 12, up-converter 13, mixing and preamplifying arrangement 3 and quadrature demodulator 7. Digital signal processor 9 is coupled with its central control arrangement 10, which is coupled on the output side with analog/digital converter 8, pulse expander 12, frequency synthesizer 11, intermediate frequency multiplexer 4, mixing and preamplifying arrangement 3 and a coder 15. From the coder 15, control signals are transferred to pulse expander 12 by way of line 107.

The operation of such a system will next be explained. In frequency synthesizer 11, central control arrangement 10 establishes a certain carrier frequency among several selectable carrier frequencies. From the pulses received from frequency synthesizer 11, a frequency-modulated transmission pulse (chirp pulse) is generated in pulse expander 12, by means of, for instance, a dispersive delay line. In addition, a characteristic phase and amplitude coding is impressed on the transmission pulse in pulse expander 12, depending on the modulation signals of coder 15. This phase and/or amplitude coding contains command and control data for a suitable flying object in the beam of the tracking radar. After receipt of a transmission triggering pulse, this coded transmission pulse is applied by central control arrangement 10 to up-converter 13, to which the chosen carrier frequency of the frequency synthesizer 11 is also applied. The transmission signal modulated in up-converter 13 upon the carrier frequency is applied to a transmission amplifier 14. The suitably amplified transmission pulse reaches by way of microwave network 2 the common transmission and reception antenna 1, where it is emitted. The line-of-sight method and the method of operation of the reception arrangement of the radar system according to the invention will be explained further below. If, for instance, a flying object is detected by the tracking radar, a steerable flying object, hereinafter referred to as a guided flying body is brought into the emitted transmission pulse directional beam. This guided flying body has a transponder according to the invention (see FIG. 4), that in dependence on the received phase-coded transmission pulse in turn emits phase-coded echo signals $E_T$. At the same time, the phase-coded transmission pulses received by the flying body are used to steer the flying object in its flight path. Between the emission of the individual transmission pulses, the passive target object echo $E_P$ and the amplified transponder echo $E_T$ are thus received by antenna 1. By means of special measures in the transponder, as explained in more detail in FIG. 4, it is ensured that the transponder echo signal and the passive object signal $E_P$ never reach the radar receiver at the same time. In microwave network 2, sum or difference signals for sum, azimuth, elevation and if need be for an error correction signal (crossfeed) are formed from the received echo signals and transferred by way of corresponding parallel reception processing channels 101, 102, 103 and 104 to mixing and preamplifying arrangement 3. In this arrangement there follows, separately for each reception processing channel, e.g. 101, the conversion of the echo signals to the intermediate frequency range and a subsequent preamplification. The carrier frequency signal necessary for this frequency conversion is received from frequency synthesizer 11, whose frequency in this case corresponds to the carrier frequency, shifted to the intermediate frequency, of the emitted transmission pulse or the received transponder echo, respectively. In the preamplifier, the received echo signals pass through a compression network controlled by central control arrangement 10, where a spectral weighting of the echo signals takes place. The echo signals shifted to the intermediate frequency range and weighted in this manner are transferred by way of the four parallel reception processing channels to an intermediate frequency multiplexer 4 which receives switching pulses from central control arrangement 10. In intermediate frequency multiplexer 4 the echo signals traverse various delay lines in the respective parallel reception processing channels, and are transferred successively to a common intermediate amplifier 5. In demultiplexer 6, the echo signals amplified successively by intermediate amplifier 5 are again split up over the parallel reception processing channels 101', 102', 103' and 104' and transferred to a quadrature demodulator 7. The latter receives combined phase-shifted signals, so that at the output side of each reception processing channel, e.g. 101', the corresponding I and Q portions of the received echo signals are available that are in phase quadrature relative to one another. In digital/analog converter 8, which receives timing signals from the central control arrangement 10, the echo signals received from quadrature demodulator 5 are digitized. They are then applied to a digital signal processor 9 which evaluates the radar angle and distance data.

In order that the tracking radar installation described above can process both passive $E_P$ and transponder echo signals $E_T$ with one and the same reception arrangement, the reception arrangement must be designed in such a way that echo signals with strongly varying dynamic range can also be processed. This can be achieved by, for instance, providing the intermediate frequency amplifier 5 with an amplitude-regulating control element that alters the amplification or attenuation factor of the intermediate frequency amplifier 5 depending on the dynamic level of the echo signals just received. The regulatory value affecting the amplification or attenuation of intermediate frequency amplifier 5 is determined in digital signal processor 9. To this end, two separate amplitude measuring arrangements are provided in signal processor 9, one for the respective higher level signal corresponding to the transponder echo $E_T$ and one for the lower level signal corresponding to the airplane echo $E_P$. As a function of the amplitude values ascertained by the amplitude measuring arrangements, corresponding regulatory values are derived that are transferred alternatingly via a change-over switch to a keyed regulator of the intermediate frequency amplifier 5 via the line 105. Since the echo signals to be processed at the input of the intermediate frequency amplifier 5 alternately present a low or high dynamic level, regulation by means of the change-over switch is effected in such a way that the higher-level signals (for instance, transponder echo signals) are suitably attenuated while lower-level signals (for instance, passive object signals) are suitably amplified. Through this keyed regulation, signals of approximately like amplitude are obtained at the output of the intermediate frequency amplifier 5.

Figure 2:
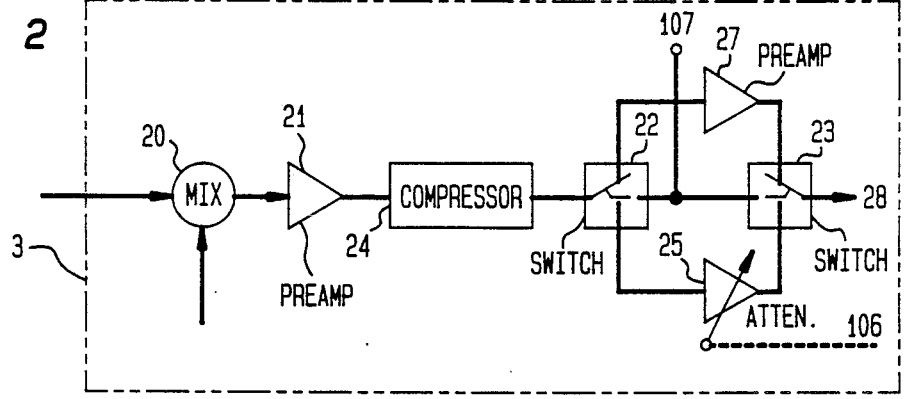
FIG. 2 shows a block diagram of an exemplary mixing and preamplifying arrangement for the tracking radar installation in accordance with the invention.

Instead of equalizing the dynamic level by means of a keyed regulating arrangement in intermediate frequency amplifier 5, another arrangement is shown in FIG. 2 for effecting a dynamic level equalization in mixing and preamplifying arrangement 3 between the received echo signals. This arrangement must be provided separately for each signal processing channel, e.g. 101. The echo signals changed to the intermediate frequency range in the mixer 20 are transferred via a preamplifier 21 to a compressor arrangement 24, where the respective expanded signal train passes through a pulse compression filter in a known manner. The compressor arrangement 24 is coupled at its output side to a change-over switch 22, which, in conjunction with a change-over switch 23, enables the selection of two parallel signal paths with different attenuation or amplification. To this end, one of the parallel signal paths has a preamplifier 27 with a constant degree of amplification, while the other parallel signal path has an attenuator 25 adjustable as to its attenuation. The regulatory value of the attenuator is derived, as previously described, in the digital signal processor 9, from the amplitude difference between the transponder echo signal $E_T$ and the passive object signal $E_P$ and transferred to attenuator 25 via the line 106. The switching-over of change-over switches 22 and 2 respectively controlled by central control arrangement 10 via the line 107, results in the higher-level signal (transponder echo signals $E_T$) being conducted by way of the signal path with attenuator 25, while the lower-level signals (passive object signals) traverse the signal path including preamplifier 27.

Because signal processing takes place in the preamplifier dependent on the dynamic level of the received echo signals, signals approximately matched as to their dynamic level are obtained at output 28.

Figure 3:
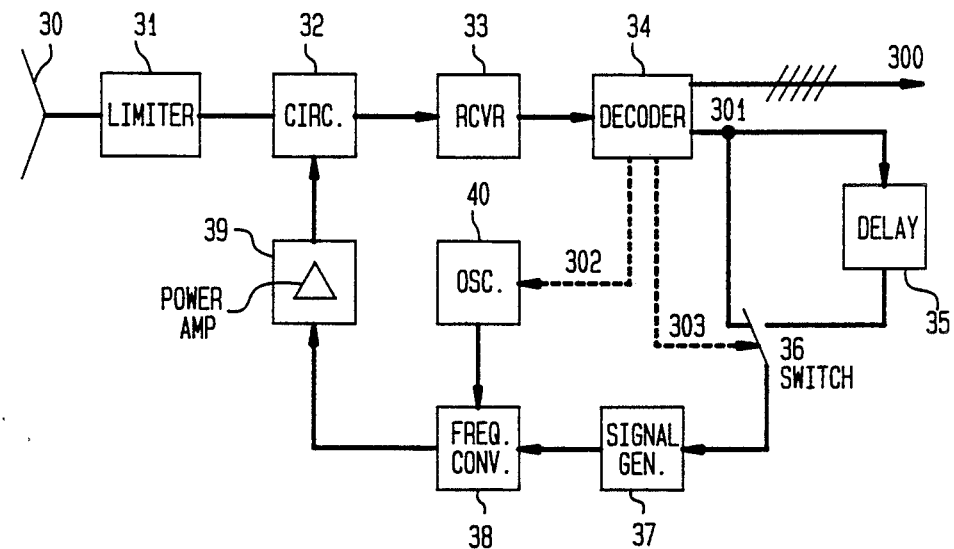
FIG. 3 shows a block diagram of a radar transponder for a radar system according to the invention.

FIG. 3 shows a transponder of a guided flying body that is a part of the radar system according to the invention. This transponder includes a decoder 34 to which the transmission pulses received from the transmitter of the tracking radar installation are applied via a series arrangement comprising a transmission and reception antenna 30, limiter 31, circulator 32 and microwave receiver 33. A signal generator 37 is coupled via a change-over switch 36 either directly or indirectly, or via a delay arrangement 35, with an output 301 of the decoder. A frequency converter 38 is coupled on the input side with signal generator 37 and an oscillator 40, and coupled on the output side via a power amplifier 39 to circulator 32. Decoder 5 transfers control signals to change-over switch 36 and oscillator 40.

The method of operation of the guided flying body transponder according to the invention, in conjunction with the tracking radar installation according to FIG. 1, will next be explained in greater detail. The phase-coded transmission pulses emitted by the transmitter of the tracking radar installation are received by a common transmission and reception antenna 30 and subsequently traverse a limiter 31. The signals thus received are transferred via circulator 32 and microwave receiver 33 coupled downstream to decoder 34, which, depending on the phase and/or amplitude coding of the received signal controls various functions in the transponder. First, the control data for the guided flying object are derived from the amplitude coding, and transferred via line 300 to a control mechanism (not shown in FIG. 3). Next, a trigger signal for the transponder transmitter is derived from the phase-coded transmission pulses. This can be done by, for instance, taking the initial slope of the received chirp pulse as the trigger release. This trigger signal can in this case be optionally transferred via change-over switch 36 either directly or indirectly or with delay to the signal generator 37. The switching on or off of delay arrangement 35 by change-over switch 36 is also effected by decoder 34 from the phase coding. In addition, the transmitting frequency of the transponder is established by decoder 34 in the oscillator 40 from the received phase coding. As soon as signal generator 37 receives the trigger signal, a chirp signal is generated that corresponds with respect to its coding and bandwidth to the transmission pulses originally generated in the transmitter and that are phase-coded but not provided with the control code. Subsequently, the chirp signal is converted in frequency converter 38 to the high-frequency carrier in the microwave range originating from oscillator 40. After subsequent amplification in amplifier 39, the high-frequency signal is radiated to the common transmission/reception antenna 30.

With the radar transponder according to the invention, the chirp signals can be emitted either directly upon reception of the trigger signal derived from the received radar transmission pulse or with a fixed time delay after the trigger signal. The time delay established by the delay arrangement 35 may be in the order of several $\mu$s.

With the aid of FIG. 4, further particulars of the complete system are explained below, with reference also to FIGS. 1 and 3. The time/distance pattern shown in FIG. 4 of two different reception signals, $E_P$ and $E_T$ of the tracking radar should be understood in conjunction with the line-of-sight method. In this, a flying object detected by a tracking radar (target) is to be brought into line of sight with a flying object brought into the radar beam, for instance. The tracking radar installation now receives, in addition to the passive echo $E_P$ of the flying object, also the transponder signals $E_T$ of the flying body and measures both. Based on the ascertained position data of the flying object and the flying body, the flight path correction data for the flying object are determined and are sent to the flying body by means of phase coding and/or amplitude coding of the radar transmission pulse. Since both the passive object echo signal $E_P$ and the transponder echo signal $E_T$ are processed by one and the same receiver (according to FIG. 1), care must be taken that the different received echo signals are separated in time, i.e. reach the input of the tracking radar installation's receiver without overlapping. In the described system an overlapping of the reception signals is avoided by controlling the triggering time of the transponder echo ($E_T$) by means of the radar transmission pulse.

Figure 4:
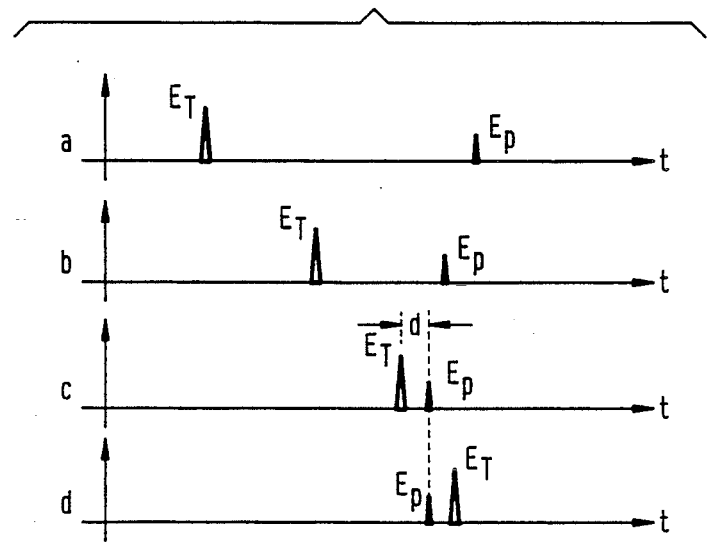
FIG. 4 shows the behavior within a given time of two echo signals received at the tracking radar installation.

FIG. 4 shows the behavior over a period of time, t, or time interval, between the echo signals $E_P$ and $E_T$ arriving at the receiver of the tracking radar installation. As shown in FIG. 4a, an initially greater difference in the distances of the flying object and the flying body results in a correspondingly great time interval between the passive echo signal $E_P$ and the transponder echo signal $E_T$. The transponder echo signal $E_T$ arrives earlier in time at the radar receiver than the passive object echo $E_P$. Thus, the radar transponder built into the flying body sends back with minimum delay a high-energy pulse of the same frequency and phase coding after reception of the radar transmission pulse from the tracking radar. The pulse repetition frequency of the flying body is thus identical and synchronous with that of the tracking radar. When the flying body now flies towards the flying object, the time interval between the received transponder echo $E_T$ and the passive echo $E_P$ of the flying object decreases accordingly. (See FIG. 4b.)

As soon as the distance between the two objects falls below a given value, i.e., when the interval in time between the two echoes has reached a certain value, at which point the flying object and the flying body are very close but can still be separated with certainty by the resolving cells of the radar system, the emitted radar transmission pulse actuates the delay arrangement in the transponder. The transponder echo $E_T$ now appears delayed in sudden bursts, lagging the passive object echo signal EP by a few $\mu s$. This process is shown in FIGS. 4c and 4d, which represent successive moments in time. According to FIG. 4d, the sequence in time of the flying body echo ET and the passive echo EP now appears reversed, i.e., the radar receiver first receives the passive object echo EP and thereafter the transponder echo ET. At this time, the flying body has not yet reached the flying object, but is still closer to the radar system.

The fact that the transponder echo signals $E_T$ are sent back delayed at a constant rate, ensures that there will be no superposition of echoes in the receiver of the radar installation, even if the two flying objects approach a distance that is below the resolution capacity of the radar. The described tracking radar installation operates with a pulse compression technique, with the transmission pulse presenting a characteristic phase coding which correlates on the reception side in a so-called pulse compression filter. Since the flying body transponder likewise sends back pulses that with respect to their coding and bandwidth correspond with the transmission pulses originally generated in the transmitter, and that are phase-coded but not provided with the control code, the same reception correlation results in the radar receiver.

I claim:

1. A radar system for determining the position of at least two objects, including a first, guided object and a second, target object, said radar system having a transmitter for transmitting pulse transmission signals and a receiver for receiving echo signals from said guided and target objects, wherein the transmitter sends control data to said guided object, by utilizing a control code impressed on a phase-coded pulse transmission, wherein said guided object sends a transponder echo signal back via a transponder to the receiver, said receiver including a microwave network on its input side, said microwave network being coupled by a plurality of reception signal processing channels to a mixing and preamplifying arrangement, characterized in that the same ones of said reception channels are provided in said receiver for both a passive echo signal that is a reflection of a pulse transmission signal from said target object and said transponder echo signal and in that said transponder provides said transponder echo signal similar with respect to coding and bandwidth to said pulse transmission originally sent by said transmitter and said transponder echo signal is phase-coded but not provided with said control code, and wherein the received echo signals are correlated in said receiver with a phase coded signal similar to said pulse transmission originally sent by said transmitter.

2. A radar system for determining the position of at least two objects, including a first, guided object and a second, target object, said radar system having a transmitter for transmitting pulse transmission signals and a receiver for receiving echo signals from said guided and target objects, wherein the transmitter sends control data to said guided object, by utilizing a control code impressed on a phase-coded pulse transmission, wherein said guided object sends a transponder echo signal back via a transponder to the receiver, said receiver including a microwave network on its input side, said microwave network being coupled by a plurality of reception signal processing channels to a mixing and preamplifying arrangement, characterized in that the same ones of said reception channels are provided in said receiver for both a passive echo signal that is a reflection of a pulse transmission signal from said target object and said transponder echo signal and in that said transponder provides said transponder echo signal similar with respect to coding and bandwidth to said pulse transmission originally sent by said transmitter and said transponder echo signal is phase-coded but not provided with said control code, and wherein a common intermediate frequency amplifier is provided in the reception signal path of said receiver for the signals of all of said reception signal processing channels, to which the signals of said parallel reception signal processing channels are successively applied via an intermediate frequency multiplexer, and wherein a demultiplexer is coupled downstream of said intermediate frequency amplifier which separates the serially amplified signals for further processing by said reception signal processing channels.

3. A radar system for determining the position of at least two objects, including a first, guided object and a second, target object, said radar system having a transmitter for transmitting pulse transmission signals and a receiver for receiving echo signals from said guided and target objects, wherein the transmitter sends control data to said guided object, by utilizing a control code impressed on a phase-coded pulse transmission, wherein said guided object sends a transponder echo signal back via a transponder to the receiver, said receiver including a microwave network on its input side, said microwave network being coupled by a plurality of reception signal processing channels to a mixing and preamplifying arrangement, characterized in that the same ones of said reception channels are provided in said receiver for both a passive echo signal that is a reflection of a pulse transmission signal from said target object and said transponder echo signal and in that said transponder provides said transponder echo signal similar with respect to coding and bandwidth to said pulse transmission originally sent by said transmitter and said transponder echo signal is phase-coded but not provided with said control code, and wherein a common intermediate frequency amplifier is provided in the reception signal path of said receiver for the signals of all of said reception signal processing channels, and said intermediate frequency amplifier includes a control unit for amplitude regulation and wherein, depending on the dynamic level of the received echo signals determined in a digital signal processor, said control unit controls the attenuation factor of said intermediate frequency amplifier by means of a keyed regulating arrangement such that both said transponder and said passive echo signals present an approximately matching signal level.

4. A radar system according to claim 2 wherein said intermediate frequency amplifier includes a control unit for amplitude regulation and wherein, depending on the dynamic level of the received echo signals determined in a digital signal processor, said control unit controls the attenuation factor of said intermediate frequency amplifier by means of a keyed regulating arrangement such that both said transponder and said passive echo signals present an approximately matching signal level.

5. A radar system for determining the position of at least two objects, including a first, guided object and a second, target object, said radar system having a transmitter for transmitting pulse transmission signals and a receiver for receiving echo signals from said guided and target objects, wherein the transmitter sends control data to said guided object, by utilizing a control code impressed on a phase-coded pulse transmission, wherein said guided object sends a transponder echo signal back via a transponder to the receiver, said receiver including a microwave network on its input side, said microwave network being coupled by a plurality of reception signal processing channels to a mixing and preamplifying arrangement, characterized in that the same ones of said reception channels are provided in said receiver for both a passive echo signal that is a reflection of a pulse transmission signal from said target object and said transponder echo signal and in that said transponder provides said transponder echo signal similar with respect to coding and bandwidth to said pulse transmission originally sent by said transmitter and said transponder echo signal is phase-coded but not provided with said control code, and wherein in order to equalize the dynamic levels of said passive and said transponder echo signals in the mixing and preamplifying arrangement, two switchable parallel signal paths of varying attenuation or amplification are provided for each reception processing channel, and wherein switch-over occurs via a central control arrangement such that said transponder echo signal is applied to a controlled attenuator and said passive echo signal is applied to a preamplifier.

6. A radar system according to claim 2, wherein in order to equalize the dynamic levels of said passive and said transponder echo signals in the mixing and preamplifying arrangement, two switchable parallel signal paths of varying attenuation or amplification are provided for each reception processing channel, and wherein switch-over occurs via a central control arrangement such that said transponder echo signal is applied to a controlled attenuator and said passive echo signal is applied to a preamplifier.

7. A transponder for use with a radar system for determining the position of at least a guided object carrying said transponder and a target object, said radar system having a transmitter for transmitting pulse transmission signals and a receiver for receiving echo signals from said guided and target objects, wherein the transmitter sends control data to said guided object, by utilizing a control code impressed on a phase-coded pulse transmission, wherein said guided object sends a transponder echo signal back via said transponder to the receiver, said receiver including a microwave network on its input side, said microwave network being coupled by a plurality of reception signal processing channels to a mixing and preamplifying arrangement, characterized in that the same ones of said reception channels are provided in said receiver for both a passive echo signal that is a reflection of a pulse transmission signal from said target object and said transponder echo signal and in that said transponder provides said transponder echo signal similar with respect to coding and bandwidth to said pulse transmission originally sent by said transmitter and said transponder echo signal is phase-coded but not provided with said control code, and wherein a decoder is coupled on the input side of said tranponder with a series arrangement comprising an antenna, a limiter, a circulator and a microwave network, and wherein said decoder derives control signals for said guided object from received coded radar transmission pulses and establishes a trigger signal for a signal generator, and wherein a delay arrangement which can be switched on by way of said decoder is provided for said trigger signal, enabling a delayed transponder echo signal triggered in said signal generator, said signal generator being coupled to said circulator by way of a frequency converter coupled to an oscillator and followed by a power amplifier.

8. A transponder for a radar system according to claim 2, wherein a decoder is coupled on the input side of said transponder with a series arrangement comprising an antenna, a limiter, a circulator and a microwave network, and wherein said decoder derives control signals for said guided object from received coded radar transmission pulses and establishes a trigger signal for a signal generator, and wherein a delay arrangement which can be switched on by way of said decoder is provided for said trigger signal, enabling a delayed transponder echo signal triggering in said signal generator, said signal generator being coupled to said circulator by way of a frequency converter coupled to an oscillator and followed by a power amplifier.

9. A transponder for a radar system according to claim 3, wherein a decoder is coupled on the input side of said transponder with a series arrangement comprising an antenna, a limiter, a circulator and a microwave network, and wherein said decoder derives control signals for said guided object from received coded radar transmission pulses and establishes a trigger signal for a signal generator, and wherein a delay arrangement which can be switched on by way of said decoder is provided for said trigger signal, enabling a delayed transponder echo signal triggering in said signal generator, said signal generator being coupled to said circulator by way of a frequency converter coupled to an oscillator and followed by a power amplifier.

10. A transponder for a radar system according to claim 4, wherein a decoder is coupled on the input side of said transponder echo with a series arrangement comprising an antenna, a limiter, a circulator and a microwave network, and wherein said decoder derives control signals for said guided object from received coded radar transmission pulses and establishes a trigger signal for a signal generator, and wherein a delay arrangement which can be switched on by way of said decoder is provided for said trigger signal, enabling a delayed transponder echo signal triggering in said signal generator, said signal generator being coupled to said circulator by way of a frequency converter coupled to an oscillator and followed by a power amplifier.

11. A transponder for a radar system according to claim 5 wherein a decoder is coupled on the input side of a transponder with a series arrangement comprising an antenna, a limiter, a circulator and a microwave network, and wherein said decoder derives control signals for said guided object from received coded radar transmission pulses and establishes a trigger signal for a signal generator, and wherein a delay arrangement which can be switched on by way of said decoder is provided for said trigger signal, enabling a delayed transponder echo signal triggering in said signal generator, said signal generator being coupled to said circulator by way of a frequency converter coupled to an oscillator and followed by a power amplifier.

12. A transponder for a radar system according to claim 6, wherein a decoder is coupled on the input side of said transponder with a series arrangement comprising an antenna, a limiter, a circulator and a microwave network, and wherein said decoder derives control signals for said guided object from received coded radar transmission pulses and establishes a trigger signal for a signal generator, and wherein a delay arrangement which can be switched on by way of said decoder is provided for said trigger signal, enabling a delayed transponder echo signal triggering in said signal generator, said signal generator being coupled to said circulator by way of a frequency converter coupled to an oscillator and followed by a power amplifier.

13. A transponder according to claim 7, wherein the pulse repetition frequency of said transponder echo signals is synchronous and identical with that of the transmitter's pulse repetition frequency.

14. A transponder according to claim 8, wherein the pulse repetition frequency of said transponder echo signals is synchronous and identical with that of the transmitter's pulse repetition frequency.

15. A transponder according to claim 12, wherein the pulse repetition frequency of said transponder echo signals is synchronous and identical with that of the transmitter's pulse repetition frequency.

16. A transponder according to claim 7, wherein said change-over from undelayed to delayed signal triggering in said signal generator takes place before the distance between two objects to be measured falls below the system's distance resolving capacity, and in that the time delay of said transponder echo signal sent with delay in order of several $\mu$s.

17. A transponder according to claim 13, wherein said change-over from undelayed to delayed signal triggering in said signal generator takes place before the distance between two objects to be measured falls below the system's distance resolving capacity, and in that the time delay of said transponder echo signal sent with delay in order of several $\mu$s.

18. A transponder according to claim 7, wherein the transponder oscillator is designed for several transmitting frequencies, which are selected via said decoder, depending on the received, coded transmission pulses.

19. A transponder according to claim 13, wherein the transponder oscillator is designed for several transmitting frequencies, which are selected via said decoder, depending on the received, coded transmission pulses.

20. A transponder according to claim 17, wherein the transponder oscillator is designed for several transmitting frequencies, which are selected via said decoder, depending on the received, coded transmission pulses.

* * * * *